United States Patent
Ligon, Sr. et al.

[11] Patent Number: 5,857,743
[45] Date of Patent: Jan. 12, 1999

[54] POWER ADJUSTABLE SIDE BOLSTER

[75] Inventors: James T. Ligon, Sr., Almont; Brett Bellmore, Capac, both of Mich.

[73] Assignee: McCord Winn Textron Inc., Manchester, N.H.

[21] Appl. No.: 796,460

[22] Filed: Feb. 10, 1997

[51] Int. Cl.$^6$ ................................................. A47C 7/14
[52] U.S. Cl. ....................................................... 297/284.9
[58] Field of Search ........................... 297/284.9, 452.34, 297/452.35, 452.36, 452.54

[56] References Cited

U.S. PATENT DOCUMENTS

| | | |
|---|---|---|
| 4,324,431 | 4/1982 | Murphy et al. . |
| 4,370,000 | 1/1983 | Kazaoka et al. ............ 297/284.9 |
| 4,500,136 | 2/1985 | Murphy et al. ............. 297/284.9 |
| 4,522,445 | 6/1985 | Goldner et al. ............. 297/284.9 |
| 4,536,030 | 8/1985 | Sakurada et al. ........... 297/284.9 |
| 4,537,444 | 8/1985 | Maruyama et al. ......... 297/284.9 |
| 4,589,695 | 5/1986 | Isono .......................... 297/284.9 |
| 4,592,588 | 6/1986 | Isono et al. ............. 297/284.9 X |
| 4,636,000 | 1/1987 | Nishino ....................... 297/284.9 |
| 4,653,805 | 3/1987 | Maloney ..................... 297/284.9 |
| 4,664,444 | 5/1987 | Murphy . |
| 4,679,855 | 7/1987 | Hattori et al. .......... 297/284.9 X |
| 4,697,848 | 10/1987 | Hattori et al. .......... 297/284.9 X |
| 4,707,027 | 11/1987 | Horvath et al. . |
| 4,756,574 | 7/1988 | Andres et al. . |
| 4,793,652 | 12/1988 | Hannah et al. ......... 297/284.9 X |
| 4,804,221 | 2/1989 | Saiki . |
| 4,856,844 | 8/1989 | Isono . |
| 4,885,513 | 12/1989 | Sakamoto et al. . |
| 4,895,412 | 1/1990 | Deley et al. ................ 297/284.9 |
| 4,913,491 | 4/1990 | Mizuno et al. . |
| 4,924,162 | 5/1990 | Sakamoto et al. ......... 297/284.9 |
| 4,924,163 | 5/1990 | Sakamoto et al. ...... 297/284.9 X |
| 4,938,529 | 7/1990 | Fourrey ...................... 297/284.9 |
| 4,965,899 | 10/1990 | Sekido et al. ........... 297/284.9 X |
| 5,044,693 | 9/1991 | Yokota ..................... 297/284.9 X |
| 5,127,708 | 7/1992 | Kishi et al. .............. 297/284.9 X |
| 5,129,704 | 7/1992 | Kishi et al. .............. 297/284.9 X |
| 5,174,629 | 12/1992 | Mizushima . |
| 5,263,765 | 11/1993 | Nagashima et al. ..... 297/284.9 X |
| 5,280,997 | 1/1994 | Andres et al. ............. 297/284.9 |
| 5,316,375 | 5/1994 | Breen ...................... 297/284.9 X |
| 5,320,409 | 6/1994 | Katoh et al. ............ 297/284.9 X |
| 5,328,236 | 7/1994 | Mizushima et al. ........ 297/284.9 |
| 5,407,248 | 4/1995 | Jay et al. ................. 297/284.9 X |
| 5,425,569 | 6/1995 | Hayes ...................... 297/284.9 X |

FOREIGN PATENT DOCUMENTS

| | | | |
|---|---|---|---|
| 2596335 | 10/1987 | France ..................... 297/284.9 |
| 37544 | 2/1986 | Japan ....................... 297/284.9 |

Primary Examiner—Peter M. Cuomo
Assistant Examiner—Rodney B. White
Attorney, Agent, or Firm—Dykema Gosset PLLC

[57] ABSTRACT

A vehicle seat having an adjustable side bolster includes a seat frame, a first plate, a second plate, a living hinge and a displacement mechanism. The first plate is fixed to the seat frame. The second plate is pivotably mounted to the first plate. The living hinge resiliently connects the first plate and the second plate. A displacement mechanism is disposed between the first plate and the second plate, selectively moving the second plate relative to the first plate between the first position and the second position. The living hinge provides a spring force tending to return the second plate to one of the first position and the second position.

17 Claims, 4 Drawing Sheets

POWER ADJUSTABLE SIDE BOLSTER

FIELD OF THE INVENTION

The present invention relates to motor vehicle seats, and more specifically, to variable position side bolsters for motor vehicle seats.

BACKGROUND OF THE INVENTION

Motor vehicle seats commonly have side bolsters on the sides of the seat back, the upright part of the seat. The side bolsters are typically vertically positioned to engage the torso of the seat occupant near the bottom of the rib cage. The side bolsters help maintain the passenger in a fixed position during vehicle maneuvers which might otherwise tend to displace the passenger laterally.

Variable position side bolsters are used to stabilize the seating position of passengers of widely varying proportions by allowing the passenger to adjust the bolsters to an optimal position. However, known variable position side bolsters commonly employ mechanisms which are undesirably complex or expensive. It is desired to provide a simple and inexpensive variable position side bolster for use in motor vehicle seats.

SUMMARY OF THE INVENTION

The inventive variable position side bolster is of simple construction and is inexpensive to fabricate.

An adjustable side bolster includes a first plate and a second plate. The first plate has a pivot edge. The second plate is connected to the first plate by a pair of living hinges disposed on opposite ends of the pivot edge. The hinges are oriented to enable pivoting substantially about the pivot edge.

A vehicle seat having an adjustable side bolster includes a seat frame, a first plate, a second plate, a living hinge, and a displacement mechanism. The first plate is fixed to the seat frame. The second plate is pivotably mounted to the first plate. The living hinge resiliently connects the first plate and the second plate. A displacement mechanism is disposed between the first plate and the second plate, selectively moving the second plate relative to the first plate between the first position and the second position the living hinge provide a spring force tending to return the second plate to one of the first position and second position.

A vehicle seat having an adjustable side bolster includes a first member, a second member, a living hinge and a displacement mechanism. The first member is fixed to the seat frame. The living hinge resiliently connects the first member and the second member. The displacement mechanism is disposed between the first member and the second member and operably displaces the first member between a first position and a second position. The living hinge provides a spring force tending to return the second member to one of the first position and the second position.

A vehicle seat having a pair of adjustable side bolsters includes: a seat frame, a first member, a second member, an actuator, a first Bowden cable, and a second Bowden cable. The first member is pivotably connected to the seat frame on a right side of the seat frame. The second member is pivotably connected to the seat frame on a left side of the seat frame. The actuator is configured to translate rotary motion into axial motion. The first Bowden cable is disposed between the actuator and the first member. The first Bowden cable has a first core fixed on one end to an axially displaceable portion of the actuator for axial movement therewith. The second Bowden cable is disposed between the actuator and the second member. The second Bowden cable has a second core fixed on one end to the axially displaceable portion of the actuator for axially movement therewith. Axial motion of the axially displaceable portion of the actuator displaces the first and the second plates between first and second positions.

DETAILED DESCRIPTION OF A PREFERRED EMBODIMENT

Figure 1:
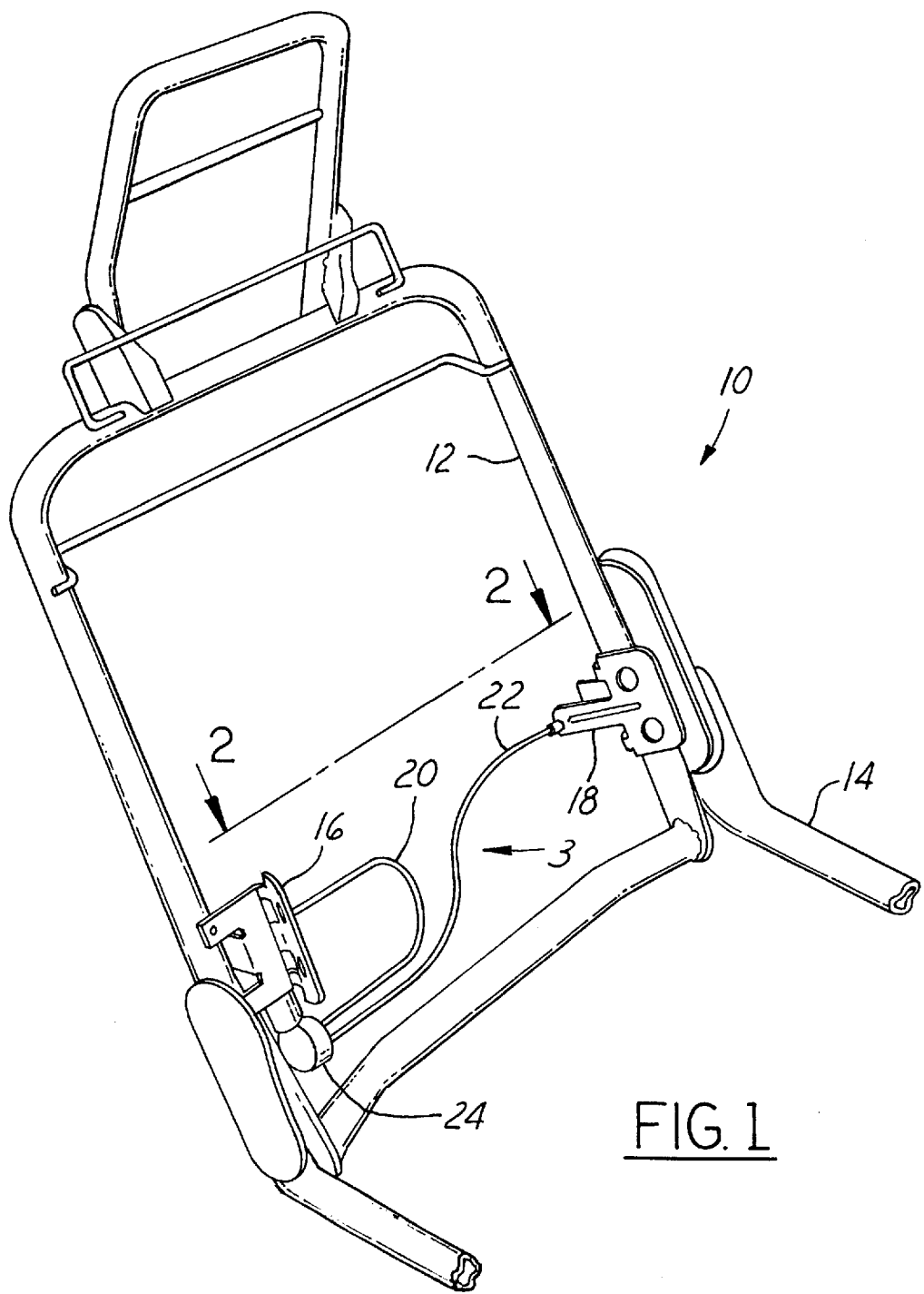
FIG. 1 is a perspective view of a seat showing a power adjustable side bolster.

A Vehicle seat 10 is shown in FIG. 1 without the cushioning or padding normally associated therewith for the purpose of better illustrating the structure of the seat 10. A seat back frame 12 is mounted to a lower cushion frame 14. A right or first side bolster assembly 16 is mounted to a right hand side of the seat back frame 12. A second or left side bolster 18 assembly is mounted to a left side of seat back frame 12.

Figure 3:
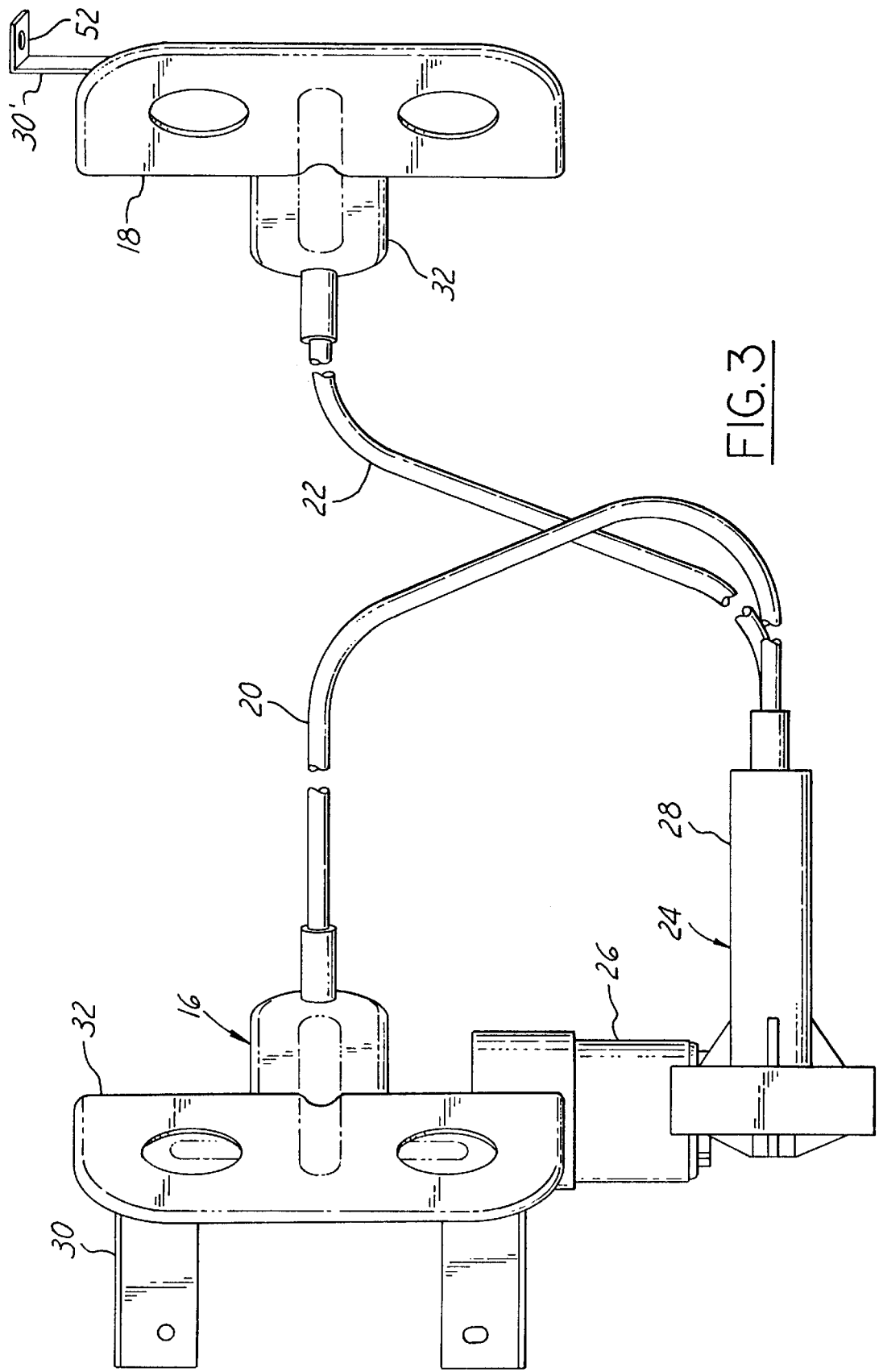
FIG. 3 is an elevational view of the inventive power adjustable side bolster in the direction of arrow 3 of FIG. 1.
Figure 4:
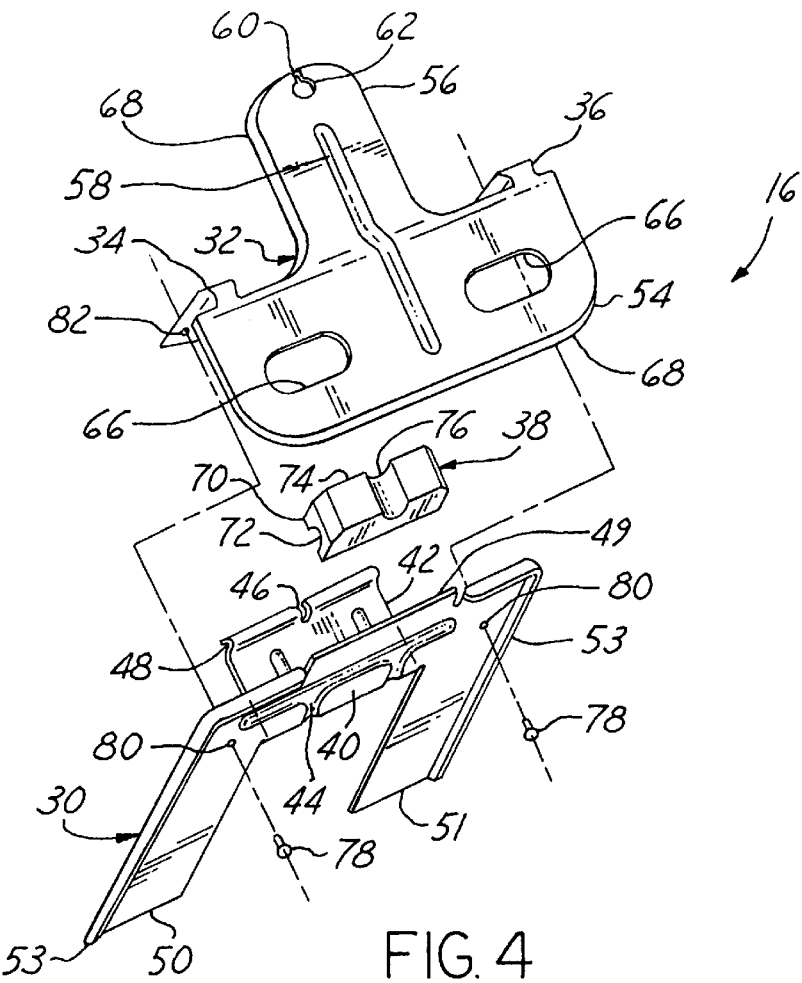
FIG. 4 is a perspective exploded view of a bolster assembly.

A first Bowden cable assembly 20 and a second Bowden cable assembly 22 are disposed between an actuator 24 and first and second side bolster assemblies 16 and 18 respectively. Actuator 24, best shown in FIG. 2 and FIG. 3., includes an electric motor 26 which operably drives a screw-type axial displacement mechanism 28. Displacement mechanism 28 translates rotary motion of the motor into axial motion of the cables. First or right side bolster assembly 16, best shown in FIG. 4, includes a stamped first or mounting member 30 fixed to the seat back frame, and a stamped second or bolster member 32 pivotally attached to first mounting member 30. A first hinge 34 and a second hinge 36 pivotally connect second member 32 with first member 30. A nylon silencer 38 is disposed between first member 30 and second member 32. Second or left side bolster assembly 18 is substantially identical to first bolster assembly 16, except its orientation is reversed, and its first member 30' is configured differently to accommodate its mounting to a different feature of the seat back frame 12.

First member 30 has a spine portion 40 extending along one side. A first or stationary loading arm 42 extends outward from spine portion 40 at an angle of approximately 90° to spine portion 40. A stiffening bead 44 having the approximate shape of the Greek letter $\pi$ is formed in spine portion 40, and extends downward into stationary loading arm 42. A cable slot 46 is cut into an end of loading arm 42 opposite spine portion 40. The end of loading arm 42 with cable slot 46 is also curved to define a cable end receiving pocket 48.

A pivot edge 49 extends along an outer portion of spine portion 40. First and second mounting legs, 50 and 51 respectively, extend from spine portion 40 opposite pivot edge 49. First member 30' of second bolster assembly 18 lacks legs 50 and 51, and instead has a mounting flange 52 extending from arm 42'. Reinforcing or stiffening lips 53, formed by bending an outer edge normal to the adjacent surface, extend along spine portion 40, first mounting leg 50, and second mounting leg 51. Lips 53 increase the stiffness of first member 30.

Second member 32 includes a bolster portion 54 and a second or pivoting loading arm 56 extending therefrom. A second stiffening bead 58, formed by pressing a groove into second member 32, extends across bolster portion 54 and loading arm 56, increasing the stiffness of second member 32. Loading arm 56 has a cable slot 60 disposed at an end thereof distal to bolster portion 54. At an end of cable slot 60 is cable sheathing retaining aperture 62 in which is disposed a sheathing end 64 of cable 20. First hinge 34 and second hinge 36 are formed integral with second member 32 and extend therefrom substantially normal to bolster portion 54 at locations laterally adjacent to loading arm 56. The thickness of the second member, and therefore the hinges 34, 36 as well as width of the hinges near bolster portion 54, affect the amount of force needed to pivot second member 32 relative to first member 30.

Weight reduction holes 66 are formed in bolster portion 54 to minimize the weight of second member 32. Reinforcing lips 68, formed by bending an outer edge normal to the adjacent surface, extend around loading arm 56 and bolster portion 54 to further reduce bending of second member 32.

Silencer 38 has the shape of a rectangular parallelepiped or block. A first side 70 has a pivot groove 72 engaging pivot edge 49. A second side 74, opposite first side 70, has a centering groove 76 oriented perpendicular to pivot groove 72. Groove 76 receives stiffening bead 58 to maintain silencer 38 in a centered position relative to second member 32.

First and second members 30 and 32 are attached to each other by a pair of rivets 78, each passing through a first aperture 80 in first member 30 and a second aperture 82 in second member 32.

Bolster assemblies 16 and 18 are assembled relatively easily. Silencer 38 is centered on second loading arm 56 by placing centering groove 76 over bead 58. First loading arm 42 is aligned with second loading arm 56 and pivot edge 49 engages pivot groove 72. Apertures 80 and 82 are aligned and rivets 78 passed therethrough and set to complete the assembly. It is appreciated that alternative fastening means, such as welding, threaded fasteners and adhesives can potentially be substituted for rivets.

Figure 2:
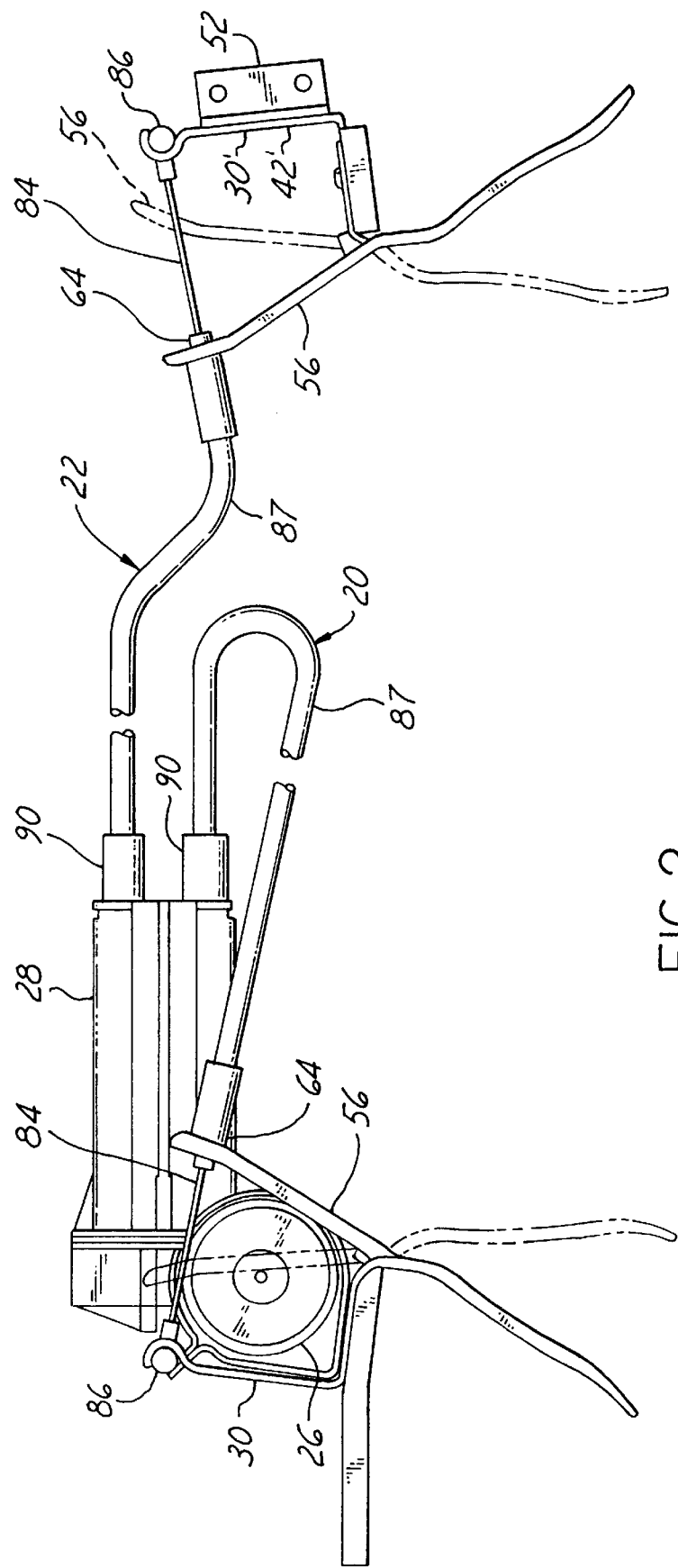
FIG. 2 is a plan view of the inventive power adjustable side bolsters in the direction of arrows 2 of FIG. 1.

Cable assemblies 20 and 22, best shown in FIG. 2, are essentially identical, varying only in their length. Each has a steel wire strand core 84 with a first end (not shown) disposed within displacement mechanism 28 which induces axial movement, and a second end 86 received by cable end receiving pocket 48. Steel wire strand core 84 is surrounded over much of its length by a housing or sheathing 87 which is flexible yet sufficiently stiff to support cable core 84. A first end 90 of each housing is fixed to displacement mechanism 24. The sheathing end or second end 64 of cable housing 88 is received by retaining aperture 62, leaving a length of cable core 84 between the first and second loading arms 42, 56 exposed.

Figure 5:
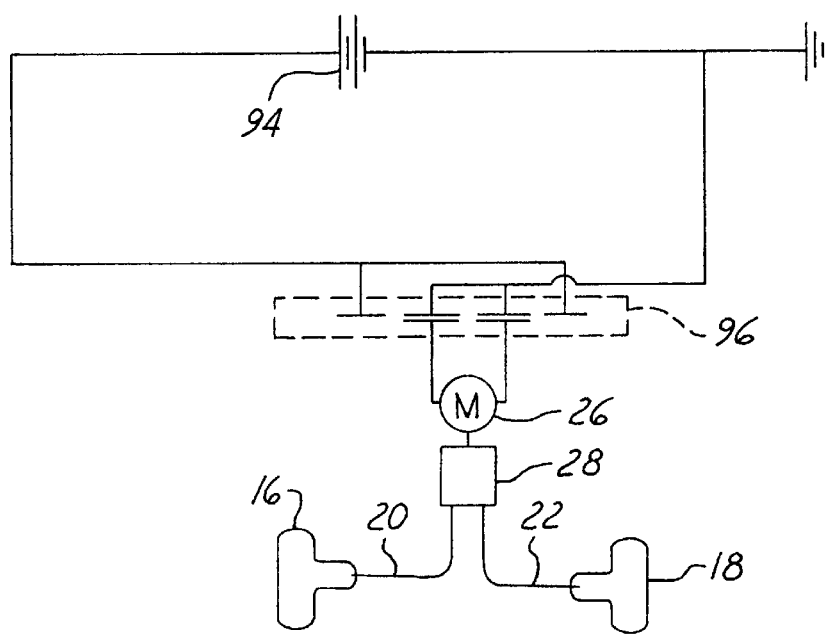
FIG. 5 is schematic diagram of the operating system of the inventive power adjustable side bolster.

FIG. 5 shows a power source, such as a battery 94, electrically connected to motor 26 through a three position switch 96. Switch 96 is shown in an off position in FIG. 5. Movement of the upper terminals of switch 96 relative to the lower terminals of switch 96 in the rightward direction of FIG. 5 will cause rotation of motor 26 in a first direction, and leftward movement of the upper terminals will cause rotation of motor 26 in a second direction.

The seat bolster assemblies operate synchronously in the following manner.

The switch of FIG. 5 is moved from a first position shown to a second position (not shown) aligning a positive and a negative terminal of the upper portion of switch 80 with the terminals of motor 26. This causes motor 26 to rotate in a first direction, in turn causing the screw mechanism within actuator 24 to axially displace ends 86 of cables 20 and 22 in a direction tending to shorten the length of exposed cable disposed between loading arm 56 and loading arm 42, thereby displacing the bolster portions 54 of both bolster assemblies 16 and 18 from a first position shown in solid lines in FIG. 2, inward to a position shown in phantom lines, providing increased passenger support. Moving switch 80 back to the first position shown in FIG. 5 terminates inward movement of bolster portions 54. Movement of switch 80 to a third position, providing positive and negative terminal contact with a polarity orientation reversed from that of the previous application, causes the motor to rotate in the second direction, thereby resulting in the length of exposed cable increasing and allowing the spring force of the hinges 34 and 36 to return bolster portions 54 back to a reduced support position. Returning the switch 80 to the first position will terminate adjustment of bolster portions 54 at a selected orientation.

It should be appreciate that while a preferred embodiment has been disclosed, variant embodiments are anticipated. For example, first mounting member 30 could potentially be integrated into the seat back frame 12. Also, this type of bolster support could also be used in the lower or seat cushion frame 14 as well as in the seat back frame 12. Further, the electrical schematic of FIG. 5 is greatly simplified, and can potentially be enhanced by combining it with known devices, such as memory devices which automatically return the adjustable seat features to a preselected condition. In light of these, and other potential variations of this invention, the invention should be considered to be limited only by the scope of the appended claims.

We claim:

1. A vehicle seat having an adjustable side bolster comprising:
    a seat frame;
    a first plate fixed to the seat frame;
    a second plate resiliently connected to the first plate by a resilient living hinge and the second plate being pivotable between a first position and a second position; and
    a displacement mechanism disposed between the first plate and the second plate selectively moving the second plate relative to the first plate between the first position and the second position wherein the living hinge provides a spring force tending to return the second plate to one of the first position and the second position.

2. A vehicle seat as claimed in claim 1 wherein the displacement mechanism is a Bowden cable with a cable end disposed at one of the first plate and the second plate and a cable sheathing end disposed at the other of the first plate and the second plate.

3. A vehicle seat having an adjustable side bolster comprising:
    a seat frame;
    a first plate fixed to the seat frame;
    a second plate resiliently connected to the first plate by a living hinge and the second plate being pivotable between a first position and a second position; and a Bowden cable with a cable end disposed at one of the first plate and the second plate and a cable sheathing end disposed at the other of the first plate and the second plate with the Bowden cable selectively moving the second plate relative to the first between the first position and the second position wherein there are two adjustable side bolsters with one mounted to a right side of the seat frame and one mounted to a left side of a seat frame with both bolsters being identical to each other and with each being operated by its own Bowden cable.

4. A vehicle seat having an adjustable side bolster comprising:

a seat frame;

a first plate fixed to the seat frame;

a second plate resiliently connected to the first plate by a living hinge and the second plate being pivotable between a first position and a second position wherein the living hinge is integral with one of the first plate and the second plate; and a displacement mechanism disposed between the first plate and the second plate selectively moving the second plate relative to the first plate between the first position and the second position.

5. A vehicle seat as claimed in claim 1 wherein the living hinge is integral with the second plate.

6. A vehicle seat as claimed in claim 1 wherein the first and second plates are steel stampings.

7. A vehicle seat as claimed in claim 1 wherein a block shaped polymeric silencer is disposed between the first plate and the second plate and separates the first plate from the second plate at a location facilitating pivoting of the second plate relative to the first plate.

8. A vehicle seat as claimed in claim 1 wherein there are a pair of living hinges substantially define an axis of rotation of the second plate relative to the first plate.

9. A vehicle seat as claimed in claim 8 wherein the first plate has a pivot edge disposed between the hinges over which a portion of the second plate extends.

10. A vehicle seat as claimed in claim 9 wherein a block shaped plastic silencer is disposed between the pivot edge and the second plate with the silencer being engaged by both the edge and the second plate.

11. A vehicle seat having an adjustable side bolster comprising:

a first member fixed to the seat frame;

a second member;

a resilient living hinge connected to the first member and the second member; and a displacement mechanism disposed between the first member and the second member for operably displacing the first member between a first position and a second position wherein the living hinge provides a spring force tending to return the second member to one of the first position and the second position.

12. A vehicle seat as claimed in claim 11 wherein the living hinge is integral with one of the first member and the second member.

13. A vehicle seat as claimed in claim 11 wherein the living hinge is integral with the second member.

14. A vehicle seat as claimed in claim 11 wherein the living hinge includes two hinge elements formed integral with the second member and spaced from each other.

15. A vehicle seat as claimed in claim 14 wherein there is a pivot edge of the first member extending from the first member about which the second member pivots.

16. A vehicle seat as claimed in claim 14 wherein a block shaped plastic silencer is disposed between the pivot edge of the first member and the second member.

17. A vehicle seat having a pair of adjustable side bolsters comprising:

a seat frame;

a first member pivotably connected to the seat frame on a right side of the seat frame;

a second member pivotably connected to the seat frame on a left side of the seat frame;

an actuator configured to translate rotary motion into axial motion;

a first Bowden cable disposed between the actuator and the first member having a first core fixed on one end to an axially displaceable portion of the actuator for axial movement therewith; and a second Bowden cable disposed between the actuator and the second member having a second core fixed on one end to the axially displaceable portion of the actuator for axial movement therewith wherein axial motion of the portion of the axially displaceable portion of the actuator displaces the first and second members between the first and second positions.

* * * * *